United States Patent [19]

Griffin, Jr. et al.

[11] 4,099,373
[45] Jul. 11, 1978

[54] VENTED IGNITER

[75] Inventors: William W. Griffin, Jr., Lake Park; Robert M. Pierce, Tequesta, both of Fla.

[73] Assignee: The United States of America as represented by the Secretary of the Air Force, Washington, D.C.

[21] Appl. No.: 795,821

[22] Filed: May 11, 1977

[51] Int. Cl.² ............................ F02C 7/18; F02C 7/26
[52] U.S. Cl. ............................... 60/39.67; 60/39.82 S; 431/263; 361/253
[58] Field of Search .................. 60/39.67, 39.82 S; 431/258, 263, 264; 361/253

[56] References Cited

U.S. PATENT DOCUMENTS 2,423,410  7/1947  Simmons .............................. 431/263

FOREIGN PATENT DOCUMENTS 880,976  6/1953  Fed. Rep. of Germany ... 60/39.82 S
802,703  7/1957  United Kingdom ............ 60/39.82 S Primary Examiner—Robert E. Garrett
Attorney, Agent, or Firm—Joseph E. Rusz; Arsen Tashjian

[57] ABSTRACT

An improved spark igniter for use in a gas turbine engine wherein vent passages which are in the vicinity of the electrode are placed in communication with the ambient environment external to the engine during the ignition sequence causing fuel-air mixture to flow over the electrode as it is abstracted from the engine, thereby enhancing the probability of ignition.

3 Claims, 4 Drawing Figures

VENTED IGNITER

STATEMENT OF GOVERNMENT INTEREST

The invention described herein may be manufactured and used by or for the Government for governmental purposes without the payment of any royalty thereon.

BACKGROUND OF THE INVENTION

This invention relates to an igniter for use on a gas turbine engine and, more particularly, the invention is concerned with providing an improved igniter in which vent passages in the vicinity of the electrode are placed in communication with the ambient environment external to the engine during ignition sequence so that fuel-air mixture abstracted from the engine will flow over the electrode, thereby enhancing the probability of ignition.

Heretofore, it has been common practice to provide igniters that extend into the combustion chambers of gas turbine and jet engines with openings through which ventilating or cooling air can be passed. Such cooling air is used to protect the igniter from damage during normal operation of the engine.

A gas turbine or jet engine is customarily started by causing the compressor section to be rotated at high velocity prior to the initial introduction of fuel so that the air flow within the engine assumes a normal working pattern. With ventilated igniters, this pattern provides for the passage of air through openings on the side of the igniter and along through the shell and out around the electrode where the initial spark is to occur. Starting problems have been encountered with these presently known igniters in most engines because the normal air flow pattern and velocity is sufficiently high to cause the fuel-air mixture to be blown away from the area where the spark occurs. When this happens, the probability of ignition is greatly diminished, especially when it becomes necessary to restart the engine after "flame-out."

Various attempts have been made to overcome the abovementioned drawbacks including, for example, closing off the working end of the igniter to prevent the cooling air from reaching the sparking tip during the ignition sequence. However, this effort did not prove successful because of the great increase in temperature of the igniter tip during operation and failure within a short time thereafter.

Thus it can be seen that it would be most desirable to provide a vented igniter that would be capable of operation under the most severe conditions without being subject to premature failure and would operate most consistently in an effective manner to start and/or restart the engine during a normal air flow pattern.

SUMMARY OF THE INVENTION

The present invention is concerned with providing a vented igniter for gas turbine or jet engines wherein the electrode tip thereof includes a series of vent passages which are configurated in such a manner that a fuel-air mixture is required to pass over the electrode tip in order to enter the passages. The fuel-air mixture which enters the passages then operates to partially cool the igniter as it is abstracted from the engine to the external ambient environment. Since the fuel-air mixture must pass in close proximity to the tip of the igniter and actually enters the electrode cavity, ignition of the engine is a virtual certainty even when it becomes necessary to restart the engine after a flame-out.

Accordingly, it is an object of the invention to provide a vented igniter wherein the fuel-air mixture is caused to flow over the electrode prior to being abstracted to the ambient environment through the vent passages.

Another object of the invention is to provide an improved vented spark igniter wherein passages normally used for cooling are redirected and transformed into vent passages. Other auxiliary cooling means can be provided for maintaining the electrode tip at a suitable safe temperature.

Still another object of the invention is to provide a vented spark igniter wherein the passages used for venting are placed in operative communication with a region of lower pressure such as the ambient external environment or a region of reduced pressure inside the engine.

A further object of the invention is to provide a vented igniter suitable for use in both main burner and augmentor sections of a gas turbine engine. The vent ports are strategically placed in the vicinity of the electrode and passages connected to the vent ports lead to a region of lower pressure such as the outside surface of the augmentor flameholder.

These and other objects, features and advantages of the invention will become more apparent after considering the following detailed description taken in conjunction with the annexed drawings and appended claims.

DETAILED DESCRIPTION OF A PREFERRED EMBODIMENT

Figure 1:
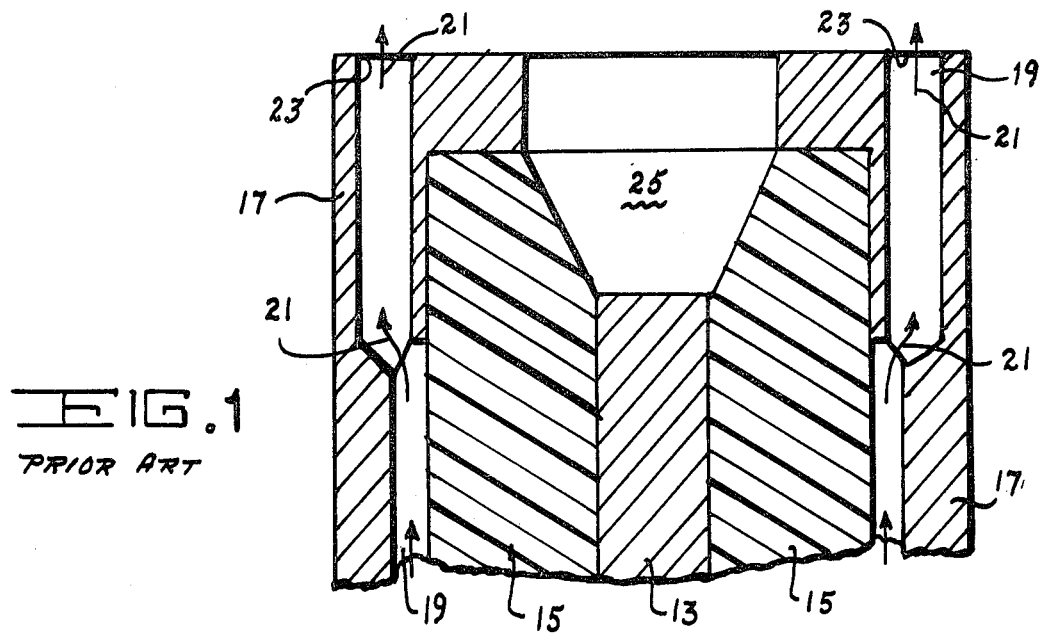
FIG. 1 is an enlarged view in longitudinal cross-section of a typical prior art igniter tip presently in use showing the central electrode and insulator surrounded by an outer shell with cooling passages therethrough.

Referring now to the drawings, in FIG. 1 there is shown the general arrangement of the elements in a prior art igniter which is typical of those used on the F100 augmentor and main burners. The central electrode 13 is surrounded by a ceramic insulator 15 which effectively prevents direct electrical contact between the electrode 13 and the outer shell 17. A series of cooling passages 19 are disposed in the outer shell 17 so that a stream of cooling air indicated by the arrows 21 passes along the sides of the igniter from the base to the tip and exits through the openings 23 in the surface of the igniter. It can be seen that as the stream of cooling air 21 passes by the surface of the igniter tip, there will be a tendency to carry any fuel-air mixture which may be in the vicinity of the electrode cavity 25 along with the air stream so that when the igniter is activated, there is no ignitable material present. This condition can be troublesome and dangerous, particularly when it becomes necessary to restart the engine after flame-out.

Figure 2:
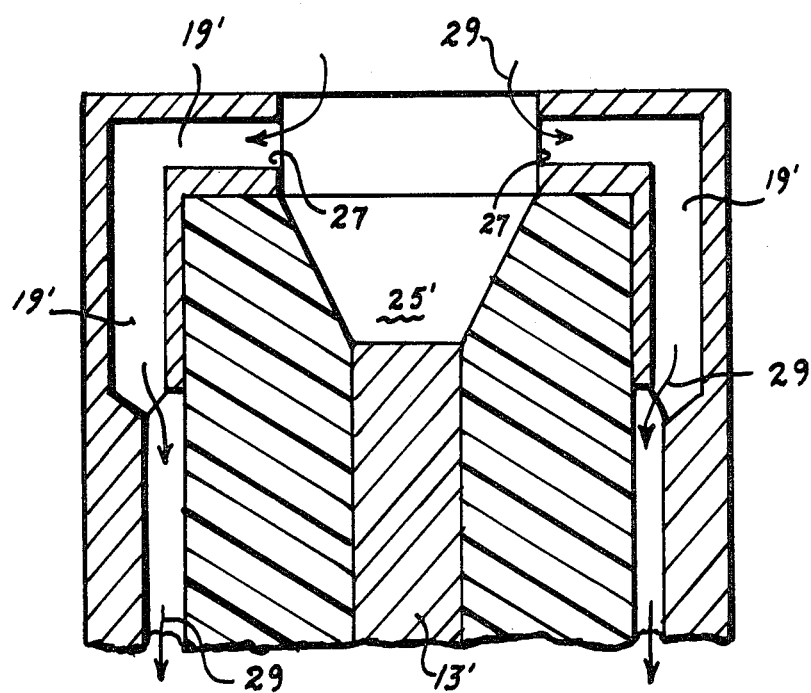
FIG. 2 is an enlarged view in longitudinal cross-section of an igniter tip according to the invention showing the unique configuration of vent passages through which the fuel-air mixture is passed.

The igniter tip according to the invention is shown most clearly in the enlarged detail view shown in FIG. 2. The passages 19 which were used as cooling passages in the prior art igniter tip (FIG. 1) are transformed into vent passages 19' by redirecting the fuel-air mixture that is present in the engine into the passages 19' through the openings 27 which are located in the upper wall of the electrode cavity 25'. The passages 19' are placed in communication with a region of lower pressure causing the fuel-air mixture to flow in the direction of the arrows 29 and over the tip of the central electrode 13' as the fuel-air mixture is abstracted from the engine. Cooling capability can be provided, if desired, by any of several alternative means. For example, alternate passages around the circumference of the tip can be used for cooling and the diameter of the tip can be increased to allow for an outer concentric cooling passage of annular configuration or a ring of holes.

Figure 3:
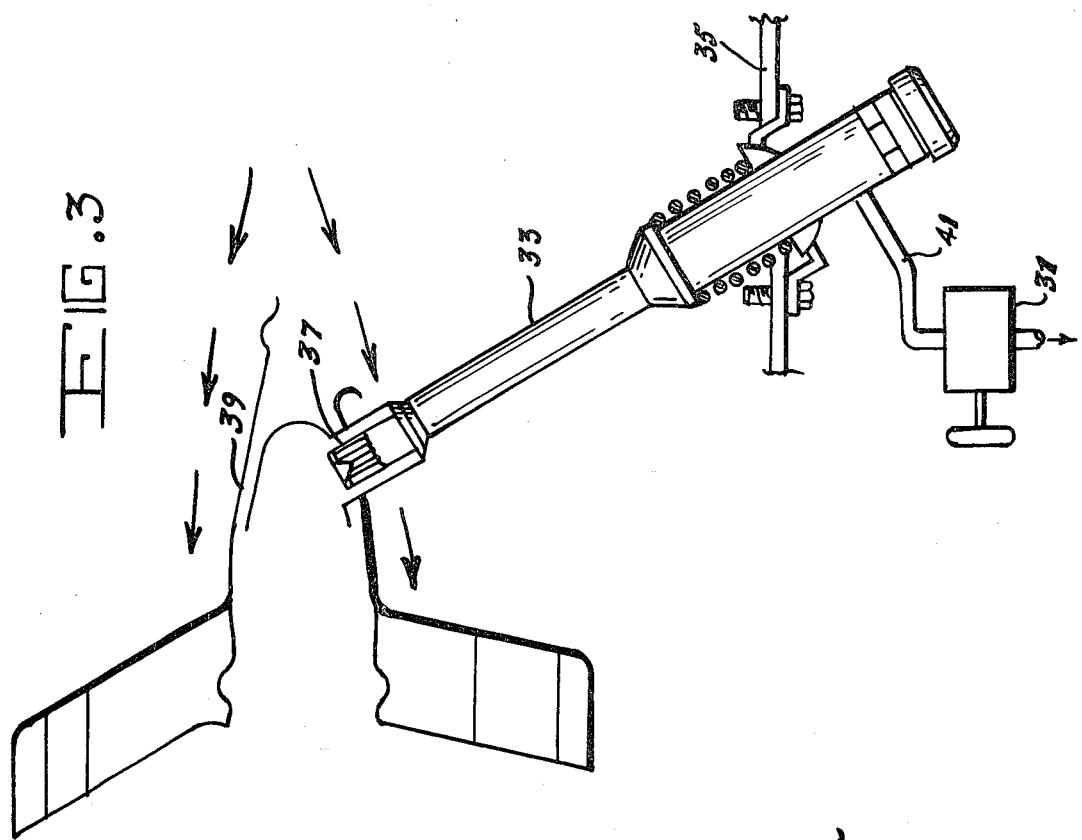
FIG. 3 is a plan view of an igniter assembly attached to a jet engine wherein the fuel-air mixture which enters the igniter tip is vented to the external environment.

In FIG. 3, an igniter with passages leading from the tip through the main body to the external environment is shown. A valve 31 is included to provide shut-off capability for the venting function. Such a valve is unnecessary when a very low flow rate is maintained in the vent passages and is necessary only when clogging, heat transfer or other problems are present.

Figure 4:
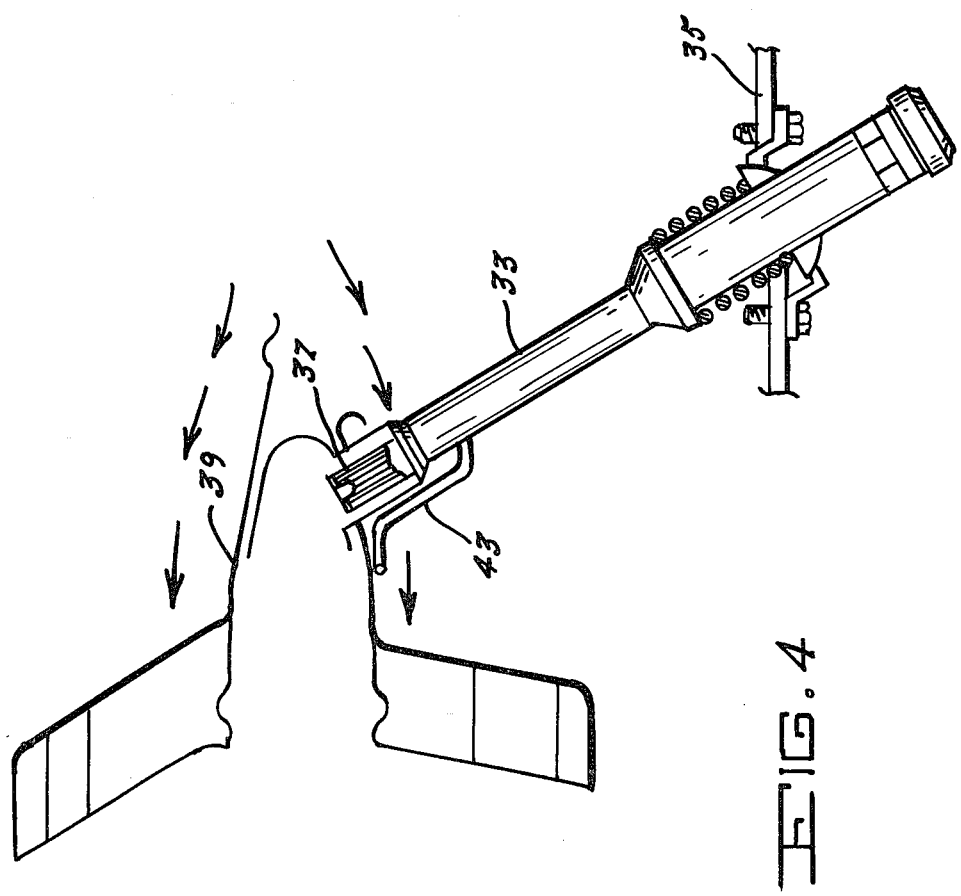
FIG. 4 is a plan view of an igniter assembly according to the invention attached to a jet engine showing the fuel-air mixture from the igniter tip being vented into a high velocity, low pressure region of the engine.

In an alternative embodiment, the vent passages can be placed in communication with other regions of reduced pressure inside the engine. In FIG. 4, for example, the passages are vented into the high velocity, low pressure region on the outside surface of the augmentor flameholder 39.

MODE OF OPERATION

In the embodiment of the invention shown in FIG. 3, the body 33 of the vented igniter is positioned within the engine case 35 with the vented igniter tip 37 extending into the region of the flameholder 39. The line 41 which is common to all vent passages serves to connect the igniter to the valve 31 which is in the open position during the ignition sequence and which is vented to ambient surroundings.

In the embodiment of the invention shown in FIG. 4 wherein the igniter is vented internally, the igniter body 33 is positioned in the engine case 35 with the vented igniter tip 37 in the vicinity of the flameholder 39. The line 43 which is common to all vent passages terminates in a high velocity, low pressure region inside the engine.

Although the invention has been illustrated in the foregoing specification in terms of preferred embodiments thereof, the invention is not limited to those embodiments or to the particular configurations shown and described. It will be apparent to those skilled in the art that certain changes, modifications and substitutions can be made in the disclosed combination without departing from the true spirit and scope of the appended claims. For example, many other alternative configurations can be envisioned for both main burner and augmentor igniters all of which involve the principal features of: (1) vent ports strategically placed in the vicinity of the electrode; and (2) connecting passages leading to a region of lower pressure either inside or outside the engine.

Having thus set forth the nature of our invention, what we claim and desire to secure by Letters Patent of the United States is:

1. An improved spark igniter for use in a gas turbine engine having a combustion means, said igniter comprising a central electrode, a ceramic insulator surrounding said central electrode and extending beyond the tip thereof, an outer shell positioned around said ceramic insulator and extending over the end surface thereof, said outer shell being spaced from the tip of said central electrode to form an electrode cavity in which a spark gap is formed, at least one vent passage in said outer shell for receiving a fuel-air mixture from within the engine, said vent passage being in communication with an outlet area of lower pressure, and at least one inlet opening in the side wall of the outer shell in the upper portion of the electrode cavity in communication with the vent passage such that the fuel-air mixture entering said opening passes near the tip of the central electrode in the electrode cavity causing the mixture to be ignited when the igniter is activated.

2. The improved spark igniter defined in claim 1 wherein the outlet end of said vent passage is in operative communication with the ambient environment external to the engine.

3. The improved spark igniter defined in claim 1 wherein the outlet end of said vent passage is in operative communication with a high velocity, low pressure region on the outside surface of the augmentor flameholder.

* * * * *